United States Patent
Lee et al.

(10) Patent No.: US 9,503,632 B2
(45) Date of Patent: Nov. 22, 2016

(54) GUIDANCE BASED IMAGE PHOTOGRAPHING DEVICE AND METHOD THEREOF FOR HIGH DEFINITION IMAGING

(71) Applicant: LG ELECTRONICS INC., Seoul (KR)

(72) Inventors: Jungho Lee, Seoul (KR); Jeongsuk Yoon, Seoul (KR); Seongsoo Lee, Seoul (KR); Jeonghwan Hwang, Seoul (KR); Shounan An, Seoul (KR); Wonkeun Yang, Seoul (KR); Jinho Sohn, Seoul (KR); Seungmin Baek, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/649,645

(22) PCT Filed: Dec. 4, 2012

(86) PCT No.: PCT/KR2012/010413
§ 371 (c)(1),
(2) Date: Jun. 4, 2015

(87) PCT Pub. No.: WO2014/088125
PCT Pub. Date: Jun. 12, 2014

(65) Prior Publication Data
US 2015/0304549 A1    Oct. 22, 2015

(51) Int. Cl.
*H04N 5/232* (2006.01)
*G06K 9/00* (2006.01)
(Continued)

(52) U.S. Cl.
CPC ...... *H04N 5/23219* (2013.01); *G06K 9/00228* (2013.01); *G06K 9/00248* (2013.01);
(Continued)

(58) Field of Classification Search
CPC ............... H04N 5/23219; H04N 5/23222; H04N 5/2258; H04N 5/247; H04N 5/23293; G06K 9/00248; G06K 9/00281; G06K 9/00302; G06K 9/00308; G06K 9/00228
See application file for complete search history.

(56) References Cited

U.S. PATENT DOCUMENTS

| 5,680,481 A * | 10/1997 | Prasad | G06K 9/00281 |
| | | | 382/118 |
| 7,454,039 B2 * | 11/2008 | Tu | G06K 9/00248 |
| | | | 382/115 |

(Continued)

FOREIGN PATENT DOCUMENTS

| JP | 2011-197999 | 10/2011 |
| KR | 10-2006-0027481 A | 3/2006 |

(Continued)

OTHER PUBLICATIONS

International Search Report dated Sep. 2, 2013 issued in Application No. PCT/KR2012/010413.

(Continued)

*Primary Examiner* — Shahbaz Nazrul
(74) *Attorney, Agent, or Firm* — KED & Associates, LLP

(57) ABSTRACT

An image photographing device for photographing images through a front camera and a rear camera, according to one embodiment of the present invention, comprises: a display unit; a feature extraction unit for extracting facial features from an image of a user's face which is displayed on a preview screen through the rear camera; a structure extraction unit for extracting the structure of the user's face by using the extracted facial features; an expression extraction unit for extracting the facial expression of the user by using the extracted facial features if the extracted structure of the face matches a standard facial structure; and an notification unit for outputting a photograph notification signal if the extracted facial expression of the user matches a standard facial expression.

20 Claims, 5 Drawing Sheets

(51) Int. Cl.
*H04N 5/225* (2006.01)
*H04N 5/247* (2006.01)

(52) U.S. Cl.
CPC ....... *G06K9/00281* (2013.01); *G06K 9/00302* (2013.01); *G06K 9/00308* (2013.01); *H04N 5/2258* (2013.01); *H04N 5/23222* (2013.01); *H04N 5/23293* (2013.01); *H04N 5/247* (2013.01)

(56) References Cited

U.S. PATENT DOCUMENTS

| | | | | |
|---|---|---|---|---|
| 7,627,149 | B2* | 12/2009 | Perlin | G06K 9/00248 382/118 |
| 7,715,598 | B2* | 5/2010 | Li | G06K 9/00281 348/E5.042 |
| 8,150,205 | B2* | 4/2012 | Watanabe | G06T 13/40 345/419 |
| 8,805,018 | B2* | 8/2014 | Li | G06K 9/00228 382/103 |
| 8,983,202 | B2* | 3/2015 | Dalton | G06K 9/00302 382/118 |
| 9,036,917 | B2* | 5/2015 | Kaneda | G06K 9/4642 382/118 |
| 9,106,821 | B1* | 8/2015 | Baldwin | H04N 5/23219 |
| 2003/0133599 | A1* | 7/2003 | Tian | G06K 9/00308 382/118 |
| 2005/0207648 | A1* | 9/2005 | Iguchi | G06K 9/00308 382/190 |
| 2006/0115157 | A1* | 6/2006 | Mori | G06K 9/00221 382/190 |
| 2006/0188144 | A1* | 8/2006 | Sasaki | G06K 9/00281 382/154 |
| 2008/0218603 | A1 | 9/2008 | Oishi | |
| 2008/0285791 | A1* | 11/2008 | Suzuki | G06K 9/00248 382/100 |
| 2009/0169108 | A1 | 7/2009 | Chou | |
| 2009/0239579 | A1 | 9/2009 | Lee et al. | |
| 2010/0053363 | A1* | 3/2010 | Kim | G06K 9/00255 348/222.1 |
| 2010/0179874 | A1* | 7/2010 | Higgins | G06K 9/00664 705/14.53 |
| 2010/0266206 | A1* | 10/2010 | Jo | G06K 9/00261 382/190 |
| 2010/0278385 | A1* | 11/2010 | Song | G06K 9/00308 382/103 |
| 2010/0315485 | A1* | 12/2010 | Song | H04N 7/147 348/14.12 |
| 2011/0008036 | A1* | 1/2011 | Takatsuka | G03B 15/00 396/283 |
| 2011/0032378 | A1* | 2/2011 | Kaneda | G06K 9/00288 348/222.1 |
| 2011/0050976 | A1* | 3/2011 | Kwon | H04N 5/23219 348/333.04 |
| 2011/0081089 | A1* | 4/2011 | Mori | G06K 9/00281 382/218 |
| 2011/0135165 | A1* | 6/2011 | Wechsler | G06K 9/6228 382/118 |
| 2011/0235919 | A1* | 9/2011 | Morita | A61B 5/18 382/195 |
| 2011/0298829 | A1 | 12/2011 | Stafford et al. | |
| 2011/0317031 | A1* | 12/2011 | Honda | H04N 5/23219 348/229.1 |
| 2012/0057039 | A1* | 3/2012 | Gardiner | H04N 5/23219 348/222.1 |
| 2012/0076418 | A1* | 3/2012 | Sasao | G06K 9/00308 382/195 |
| 2013/0242136 | A1* | 9/2013 | Chen | H04N 5/23219 348/231.99 |
| 2015/0049179 | A1* | 2/2015 | Son | G06K 9/00604 348/78 |
| 2015/0186912 | A1* | 7/2015 | el Kaliouby | G06Q 30/0217 705/14.19 |
| 2015/0310261 | A1* | 10/2015 | Lee | G06K 9/00302 382/203 |
| 2015/0358498 | A1* | 12/2015 | Eom | H04N 1/2112 348/231.99 |
| 2016/0044237 | A1* | 2/2016 | Hsu | G06K 9/00241 348/222.1 |
| 2016/0105604 | A1* | 4/2016 | Perez-Feliciano | H04N 5/247 348/262 |

FOREIGN PATENT DOCUMENTS

| | | |
|---|---|---|
| KR | 10-2006-0068242 A | 6/2006 |
| KR | 10-2008-0081859 | 9/2008 |
| KR | 10-2008-0089839 A | 10/2008 |
| KR | 10-2009-0101733 A | 9/2009 |
| KR | 10-2010-0027700 A | 3/2010 |
| KR | 10-2011-0102677 A | 9/2011 |
| KR | 10-2011-0123630 A | 11/2011 |

OTHER PUBLICATIONS

Korean Office Action dated Jan. 7, 2016 issued in Application No. 10-2015-7009655.
Korean Office Action dated Jun. 2, 2016.

* cited by examiner

GUIDANCE BASED IMAGE PHOTOGRAPHING DEVICE AND METHOD THEREOF FOR HIGH DEFINITION IMAGING

CROSS-REFERENCE TO RELATED PATENT APPLICATION

This application is a U.S. National Stage Application under 35 U.S.C. §371 of PCT Application No. PCT/KR2012/010413, filed Dec. 4, 2012, whose entire disclosure is incorporated herein by reference.

TECHNICAL FIELD

The present disclosure relates to an image photographing device and method.

BACKGROUND ART

With the recent development of an image processing technology, image photographing devices emerge and being widely used such as a digital camera, a camcorder, and a cell phone camera obtained by adding an image photographing function to a portable communication terminal, such as a cell phone that human beings may easily carry. These image photographing devices also include a function of photographing a moving picture for a moving subject as well as a still picture, and are being especially used for photographing an image for a human being.

Also, since a camera is installed on each of the front and rear surfaces of a portable communication terminal, a user may also use a front camera and a rear camera to photograph his or her images.

However, in the case of the front camera, the user may see an angle and pose through a preview screen and thus easily photograph, but the front camera generally lacks in picture quality or resolution compared to the rear camera and thus there is a limitation in that user satisfaction decreases.

Disclosure of the Invention Technical Problem

Embodiments provide an image photographing device and method that may transmit, based on an angle or pose preferred by a user registered with a front camera, a guide signal to the user to enable the user to photograph with a rear camera and thus easily obtain a desired image having high definition.

Technical Solution

In one embodiment, an image photographing device photographing an image through a front camera and a rear camera includes a display unit; a feature extraction unit extracting facial features from an image of a user's face displayed on a preview screen through the rear camera; a structure extraction unit extracting the structure of the user's face by using the extracted facial features; an expression extraction unit extracting the expression of the user by using the extracted facial features if the extracted structure of the face matches a standard facial structure; and a notification unit outputting a photographing notification signal if the extracted expression of the user matches a standard facial expression.

In another embodiment, an image photographing method of an image photographing device photographing an image through a front camera and a rear camera includes displaying an image of a user's face on the preview screen of a display unit through the rear camera; extracting facial features from the image of the user's face displayed; extracting the structure of the user's face by using the extracted facial features; extracting the expression of the user by using the extracted facial features if the extracted structure of the face matches a standard facial structure; and outputting a photographing notification signal if the extracted expression of the user matches a standard facial expression.

Advantageous Effects

Various embodiments may transmit, based on an angle or pose preferred by a user registered with a front camera, a guide signal to the user to enable the user to photograph his or her images with a rear camera and thus easily obtain a desired image having high definition.

MODE FOR CARRYING OUT THE INVENTION

A mobile terminal related to an embodiment is described below in more detail with reference to the accompanying drawings.

Figure 1:
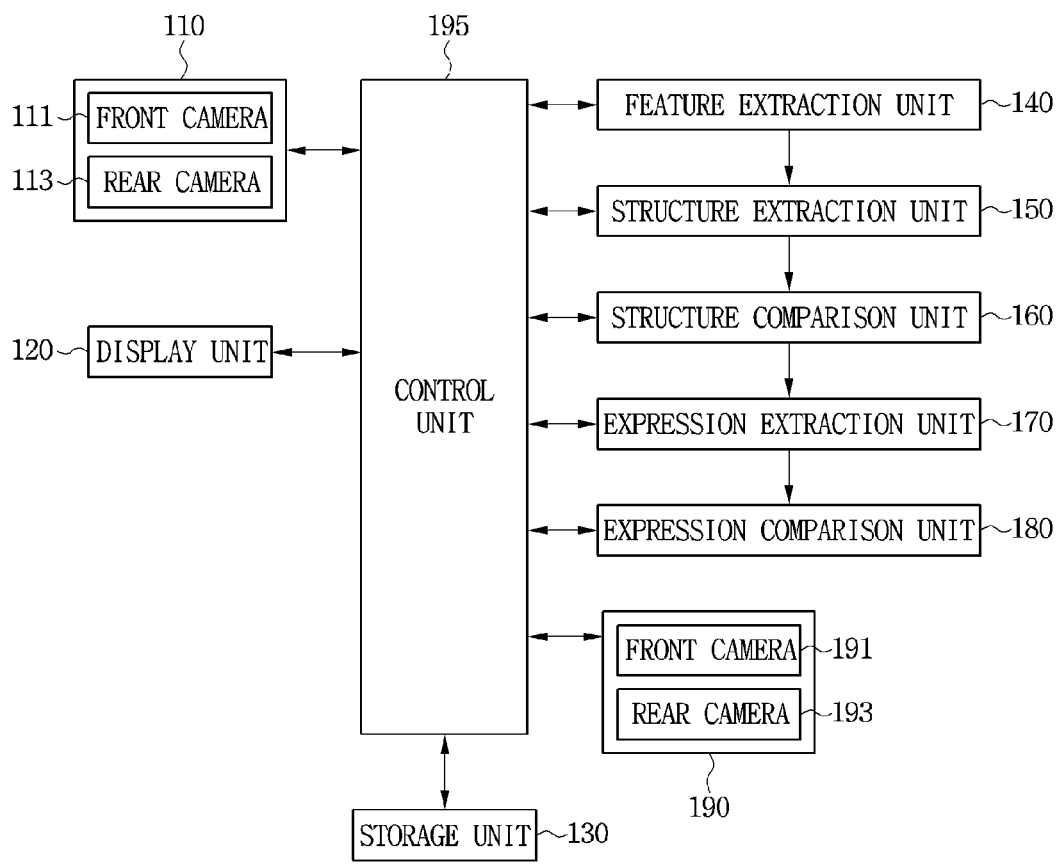
FIG. 1 is a block diagram for explaining the configuration of an image photographing device according to an embodiment.

FIG. 1 is a block diagram for explaining the configuration of an image photographing device 100 according to an embodiment.

Referring to FIG. 1, the image photographing device 100 may include a camera unit 110, a display unit 120, a storage unit 130, a feature extraction unit 140, a structure extraction unit 150, a structure comparison unit 160, an expression extraction unit 170, an expression comparison unit 180, an alarm unit 190, and a control unit 195.

The image photographing device 100 according to an embodiment may be installed in a mobile terminal and include a cell phone, a smart phone, a laptop computer, a digital broadcasting terminal, a personal digital assistant (PDA), a portable multimedia player (PMP), and a navigation device. However, a person skilled in the art may easily appreciate that a configuration according to an embodiment described herein may be applied not only to the mobile terminal but also to a fixed terminal, such as a digital TV, desktop computer, and so on.

The display unit 120 displays (outputs) information processed by the image photographing device 100. For example, when the image photographing device 100 is in a photographing mode, it is possible to display an image photographed and/or received, UI or GUI.

The display unit 120 may include at leas one of a liquid crystal display (LCD), a thin film transistor-liquid crystal display (TFT LCD), an organic light-emitting diode (OLED), a flexible display, and a 3D display.

Some of the displays may be configured as transparent or optically transferable to enable viewing of the outside therethrough. The displays may be referred to as transparent displays which include a transparent OLED (TOLED) as a typical example. The back structure of the display unit 120 151 may also be configured as optically transferable. Due to such a structure, a user may see objects located on the back side of a terminal body through a region which the display unit 120 of the terminal body occupies.

Depending on the implementation of the image photographing device 100, the display unit 120 may exist in plurality. For example, a plurality of display units 120 may be arranged to be spaced apart from one another or integrally on one surface of the image photographing device 100, or may also be respectively arranged on different surfaces thereof.

When the display unit 120 and a sensor sensing a touch operation (hereinafter, referred to as a 'touch sensor') form a mutually layered structure (hereinafter, referred to as a 'touch screen'), the display unit 120 may also be used as an input device in addition to an output device. The touch sensor may have e.g., a touch film, touch sheet, or touch pad form.

The camera unit 110 may include a front camera 111 and a rear camera 113.

The front camera 111 may be installed on the front surface of the image photographing device 100 and process a picture frame, such as a still picture frame or a moving picture frame obtained in a photographing mode, and the processed picture frame may be displayed through the display unit 120.

The rear camera 113 may be installed on the rear surface of the image photographing device 100 and process a picture frame, such as a still picture frame or a moving picture frame obtained in the photographing mode, and the processed picture frame may be displayed through the display unit 120.

In general, the rear camera 113 may be better in picture quality or resolution compared to the front camera 111.

The storage unit 130 may store a standard facial structure, which may be standard facial information, i.e., information on the angle, direction and area of a standard face. In this example, since the area of a face displayed on the preview screen may gradually decrease with an increase in distance between the image photographing device 100 and a user face and gradually increase with a decrease in the distance, the area of the standard face may be used in the same meaning as the distance between the image photographing device 100 and the user face.

The storage unit 130 may store a standard facial expression, which may be standard expression information, i.e., information on a standard eye expression and information on a standard mouth expression.

In an embodiment, the standard facial expression may be an expression for leading the facial expression of a user displayed on the preview screen of the display unit 120 to a facial expression that the user desires, which may be set differently according to user preference. That is, the storage unit 130 may store a standard facial expression that the user has set, among facial expressions previously photographed by the user.

The storage unit 130 may include at least one type storage medium of, for example, a flash memory type memory, a hard disk type memory, a multimedia card micro type memory, and a card type memory (for example, an SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The mobile terminal 100 may also operate along with a web storage that performs a storage function of the memory 160 over the internet.

The feature extraction unit 140 may extract the facial feature of the current user from a facial image displayed on the preview screen of the display unit 120.

In an embodiment, the feature extraction unit 140 may use the eyes, nose, mouth and ears of a user face displayed on the preview screen to extract the facial features of a user. Detailed descriptions are provided below.

The structure extraction unit 150 may use facial features extracted from the feature extraction unit 140 to extract the facial structure of the user displayed on the preview screen.

In an embodiment, the structure extraction unit 150 may use geometric verification to extract the facial structure of the user displayed on the preview screen. Detailed descriptions are provided below.

The structure comparison unit 160 may check whether the facial structure of the user extracted matches the standard facial structure stored in the storage unit 130.

The expression extraction unit 170 may extract the expression of a user face displayed on the preview screen when it is confirmed that the extracted facial structure matches the stored standard facial structure. Detailed descriptions are provided below.

The expression comparison unit 180 may check whether the expression of the user extracted matches the standard facial expression stored in the storage unit 130.

The alarm unit 190 may include a guide signal output unit and a notification signal output unit.

The alarm unit 190 may output audio data stored in the storage unit 130 in a call signal receiving mode, a call mode, a recording mode, a voice recognition mode, a broadcasting receiving mode, a photographing mode, or the like. The alarm unit 190 may include a receiver, speaker, buzzer, or the like.

The guide signal output unit may output a guide signal enabling a user to change the angle, direction and position of a user face when it is confirmed that the extracted facial structure does not match the standard facial structure, and output a guide signal enabling the user to match the facial expression of the user with the standard facial expression when it is confirmed that the extracted user expression does not match the standard facial expression. Detailed descriptions are provided below.

The notification signal output unit may output a photographing notification signal when it is confirmed that the extracted user expression matches the standard facial expression.

The control unit 195 may control the overall operations of the image photographing device 100.

For example, the control unit performs the control and processing associated with photographing, voice calls, data communication, and video calls.

Figure 2:
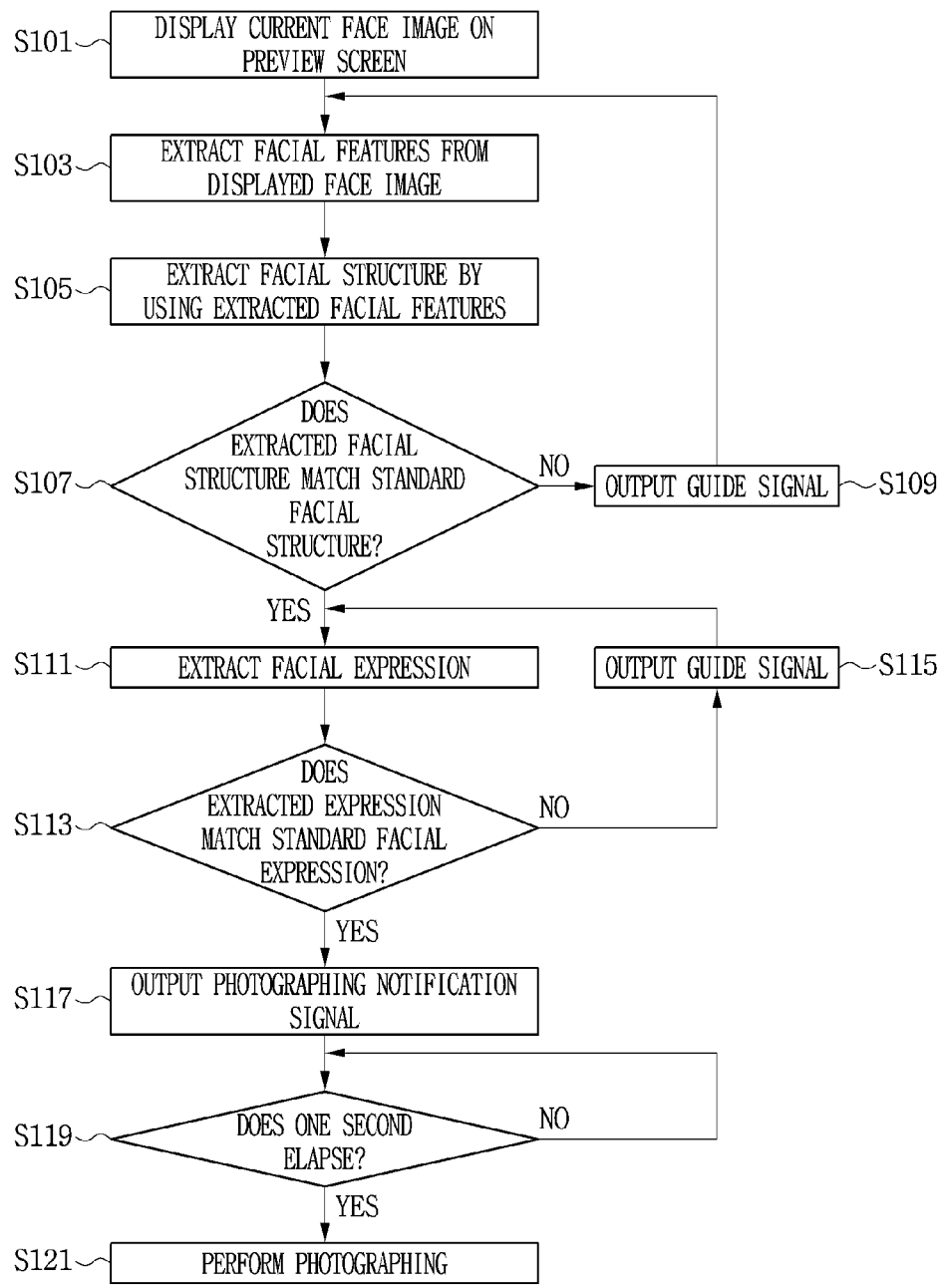
FIG. 2 is a flow chart for explaining an image photographing device and method according to an embodiment.

FIG. 2 is a flow chart for explaining an image photographing device 100 and method according to an embodiment.

In the following, the image photographing method of the image photographing device 100 according to an embodiment is described in connection with FIG. 1.

The display unit 120 of the image photographing device 100 displays the facial image of the current user on the preview screen of the display unit 120 in step S101. In an embodiment, the facial image of the current user displayed on the preview screen of the display unit 120 may be an image input through the rear camera 113.

Then, the feature extraction unit 140 of the image photographing device 100 extracts the facial features of the current user from the facial image displayed on the preview screen in step S103. In an embodiment, the feature extraction unit 140 may use the eyes, nose, mouth and ears of a user face displayed on the preview screen to extract the facial features of a user.

In particular, the feature extraction unit 140 may extract the contour (edges) of the eyes, nose, mouth and ears of the user face displayed on the preview screen, through an Eigenface algorithm. The Eigenface algorithm is an algorithm used for low-dimensionally recognizing a high-dimensional image by using a plurality of Eigen vectors to easily express a face.

The feature extraction unit 140 may individually extract the contour of the eyes, nose, mouth and ears through the Eigenface algorithm, and extract candidate regions on which the eyes, nose, mouth and ears are located, from a user face displayed on the preview screen through the individually extracted contour.

In an embodiment, the feature extraction unit 140 may further extract a region of hair of the user displayed on the preview screen. That is, the feature extraction unit 140 may form a standard texture model of various kinds of hair texture through a linear support vector machine and extract the region of hair of the user. Since the linear support vector machine is a known technology, its detailed descriptions are omitted.

Then, the structure extraction unit 150 of the image photographing device 100 uses facial features extracted by the feature extraction unit 140 to extract a facial structure in step S105. Step S105 is a step for more accurately detecting the facial region of the user displayed on the preview screen. Te structure extraction unit 150 may use geometric verification to extract the facial structure of the user displayed on the preview screen. The geometric verification is a technique that uses a relative location of the extracted facial features, i.e., eyes, nose, mouth and ears of the face to search for a facial region that my be present.

In an embodiment, the structure of the user face may mean the angle, direction and area of the user face displayed on the image photographing device 100 and the preview screen.

Then, the structure comparison unit 160 checks whether the facial structure of the user extracted matches the standard facial structure stored in the storage unit 130. The storage unit 130 may store the standard facial structure, which may be standard facial information, i.e., information on the angle, direction and area of a standard face. In this example, since the area of a face displayed on the preview screen may gradually decrease with an increase in distance between the image photographing device 100 and a user face and, may gradually increase with a decrease in the distance, the area of the standard face may be used in the same meaning as the distance between the image photographing device 100 and the user face.

In an embodiment, the standard facial structure may be a structure for leading an facial image displayed on the preview screen of the display unit 120 to a photographing structure that the user desires, and may be set according to user preference. That is, the storage unit 130 stores the standard facial structure set by the user among photographing structures in which the user has previously photographed.

Also, the standard facial structure may be set based on an image photographed through the front camera 111 of the image photographing device 100. That is, since a photographing structure that the user desires may be obtained only when the user checks it directly with his or her eyes, the standard facial structure stored in the storage unit 130 may be obtained through the front camera of the image photographing device 100. If it is confirmed that the extracted facial structure does not match the standard facial structure, the guide signal output unit outputs a guide signal enabling the user to change the angle, direction, and position of the user face in step S109. In an embodiment, the guide signal may be an auditory guide signal utilizing user's hearing, a tactile guide signal utilizing user's touch, or a visual guide signal utilizing user's sight, and the guide signal output unit may output at least one of the auditory guide signal, the tactile guide signal, and the visual guide signal when the extracted facial structure does not match the standard facial structure. Related description is provided with reference FIGS. 3 to 5.

Figure 3:
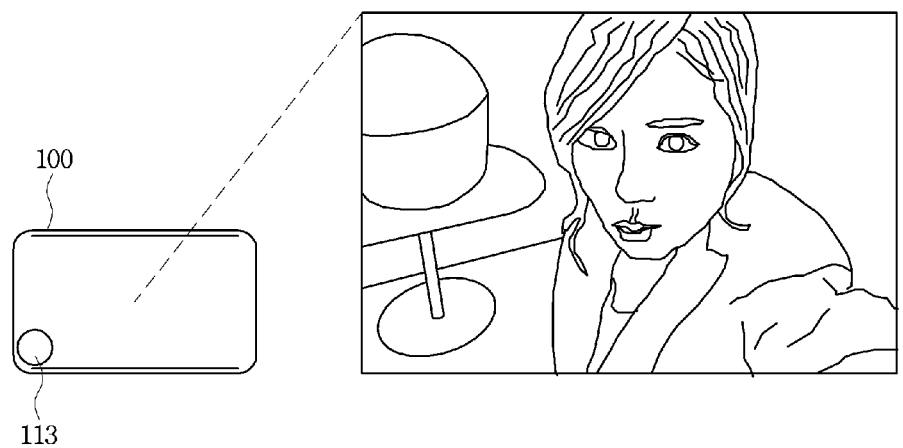
FIG. 3 is a diagram for explaining a process of photographing, by a user, his or her face through a rear camera of an image photographing device.
Figure 4:
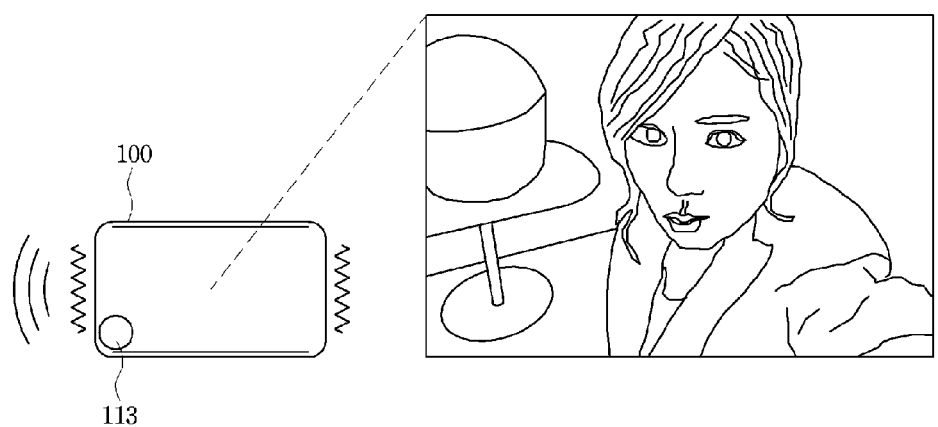
FIG. 4 is a diagram for explaining a process of outputting a guide signal when the facial structure of a user displayed on the current preview screen does not match a standard facial structure.
Figure 5:
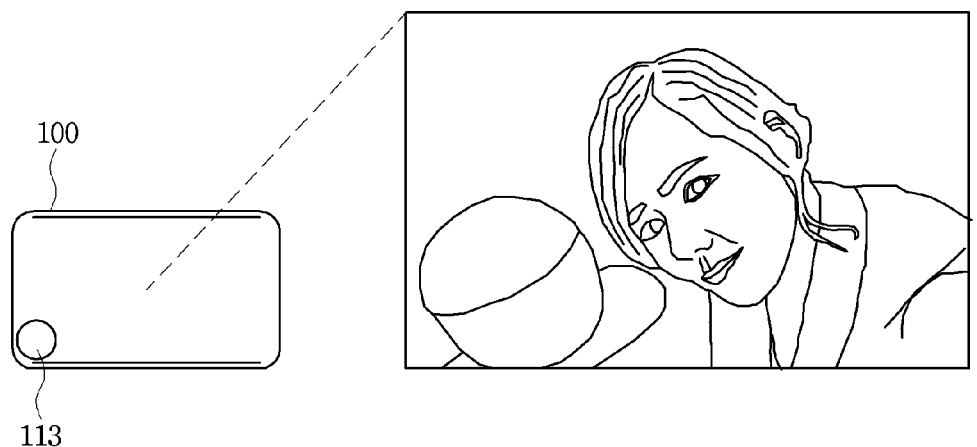
FIG. 5 is a diagram for explaining a process of changing, by a user, his or her facial structure according to an output guide signal.

FIG. 3 is a diagram for explaining a process of photographing, by a user, his or her face through a rear camera 113 of an image photographing device 110, FIG. 4 is a diagram for explaining a process of outputting a guide signal when the facial structure of a user displayed on the current preview screen does not match a standard facial structure, and FIG. 5 is a diagram for explaining a process of changing, by a user, his or her facial structure according to an output guide signal.

Referring to FIG. 3, a user prepares for a specific facial structure in order to photograph his or her face through the image photographing device 100 and a user having the specific facial structure is displayed on the preview screen of the image photographing device 100. Especially, it is assumed that the user photographs his or her face through the rear camera 113 of the image photographing device 100. Thus, the user may check the preview screen of the image photographing device 100 in the current state.

In this state, when the current facial structure of the user does not match a stored standard facial structure, the guide signal output unit may output an auditory guide signal and a tactile guide signal changing the facial structure of the user as shown in FIG. 4. For example, the guide signal output unit may output an auditory guide and a tactile guide signal that change the angle of the user face so that the user turns his or her head to the right. In an embodiment, the tactile guide signal may be a vibration signal enabling the user to feel a tactile effect through the kinaesthesia of the finger of the user being in touch with the image photographing device 100, which is however an example.

Referring to FIG. 5, the user changes his or her facial structure by the auditory guide signal and tactile guide signal of the guide signal output unit so that it is suitable for a standard facial structure. The user may confirm through the guide signal output from the guide signal output unit that the current facial structure does not match the standard facial structure, change the facial structure so that the current facial structure matches the standard facial structure, and prepare for photographing in a desired photographing structure.

Refer back to FIG. 2.

On the other hand, when it is confirmed that the extracted facial structure matches the standard facial structure, the expression extraction unit 170 of the image photographing device 100 extracts the expression of the user's face displayed on the preview in step S111.

In an embodiment, the expression extraction unit 170 may extract the contours (edges) of the eye and mouth regions of the user displayed on the preview screen to extract the expression of the user. In particular, the expression extraction unit 170 may extract a closed curve through the edges of the extracted eye and mouth regions and use the extracted closed curve to detect the expression of the user. More particularly, the extracted closed curve may be an ellipse and when it is assumed that the closed curve is the ellipse, the expression extraction unit 170 may use the reference point of the ellipse, the length of a long axis, and the length of a short axis to detect the expression of the user. Related descriptions are provided with reference to FIG. 6.

Figure 6:
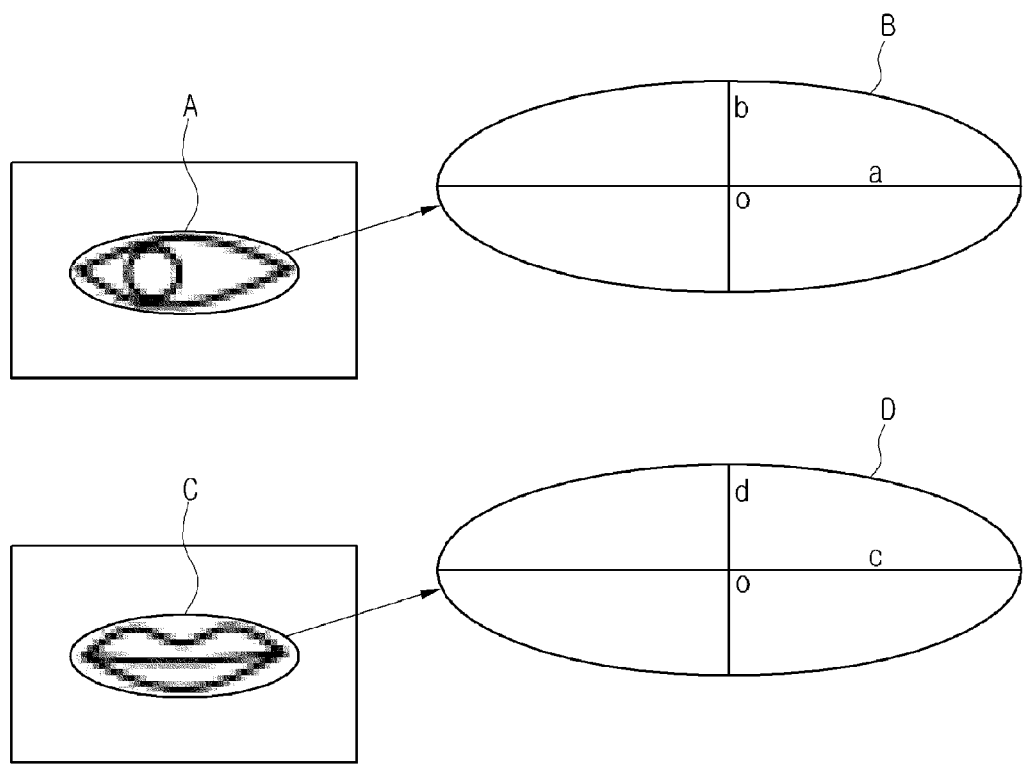
FIG. 6 is a diagram for explaining a method of extracting the expression of a user through the edges of the eye and mouth regions of the user displayed on a preview screen according to an embodiment.

FIG. 6 is a diagram for explaining a method of extracting the expression of a user through the edges of the eye and mouth regions of the user displayed on a preview screen according to an embodiment.

FIG. 6 shows the contour A of the eye region of the user, a first closed curve B of the contour of the eye region, the contour C of the mouth region of the user, and a second closed curve D of the contour of the mouth region. In general, since the expression of the user may be expressed by eyes and mouth, an embodiment assumes that the expression of the user is extracted by using the contours of the eye and mouth regions of the user and that the first closed curve B and the second closed curve D are ellipses.

The length of the long axis of the first closed curve B is 0, the length of the short axis thereof is b, the length of the long axis of the second closed curve D is c, and the length of the short axis thereof is d. The lengths of the long axes and short axes of the first and second closed curves B and D may depend on the expression of the user. For example, when the user has a smiling expression, the length a of the long axis of the first closed curve B and the length c of the long axis of the second closed curve D may generally increase, and the length b of the short axis of the first closed curve B and the length d of the short axis of the second closed curve D may decrease.

The expression extraction unit 170 may compare the relative ratio of the length of the long axis and the length of the short axis of each closed curve to extract the expression of the user. That is, the expression extraction unit 170 may compare the relative ratio of the length of the long axis and the length of the short axis of each closed curve, check how wide the eyes of the user and how much the mouth of the user are open, and extract the expression of the user through a check result.

In an embodiment, the expression extraction unit 170 may use the first closed curve of the extracted exe region and the second closed curve of the extracted mouth region to extract the expression of the user, but the inventive concept has no need to be limited thereto and it is also possible to use only the first closed curve of the eye region or the second closed curve of the mouth region to extract the expression of the user.

Refer back to FIG. 2.

The expression comparison unit 180 of the image photographing device 100 checks whether the expression of the user extracted matches a standard facial expression stored in the storage unit 130 in step S113. The storage unit 130 may store a standard facial expression, which may be standard expression information, i.e., information on a standard eye expression and information on a standard mouth expression.

In an embodiment, the standard facial expression may be an expression for leading the facial expression of a user displayed on the preview screen of the display unit 120 to a facial expression that the user desires, which may be set differently according to user preference. That is, the storage unit 130 may store a standard facial expression that the user has set, among facial expressions previously photographed by the user.

If it is confirmed that the extracted user expression does not match the standard facial expression, the guide signal output unit 191 outputs a guide signal in step S115.

In this case, the output guide signal is a signal that may be generated when the facial expression of the user extracted does not match the standard facial expression, and the guide signal output unit may output at least one of an auditory guide signal utilizing user's hearing, a tactile guide signal utilizing user's touch, or a visual guide signal utilizing user's sight to enable the user to match the facial expression of the user with the standard facial expression.

On the other hand, when it is confirmed that the extracted user expression matches the standard facial expression, the notification signal output unit of the image photographing device 100 outputs a photographing notification signal in step S117. In an embodiment, the photographing notification signal is a signal output when the facial structure of the user image displayed on the preview screen matches the standard facial structure and the facial expression matches the standard facial expression, and may be a signal notifying the user that photographing is imminent. The photographing notification signal may be a signal utilizing at least one of user's hearing, touch, and sight.

The control unit 195 of the image photographing device 100 checks in step S119 whether one second has elapsed from when the photographing notification signal has output, and automatically photographs the user image displayed on the preview screen ins step S121 when one second has elapsed. In an embodiment, the image photographing device 100 may photograph the user imaged through the rear camera 113.

According to an embodiment, the above-described method may also be embodied as processor readable codes on a program-recorded medium. Examples of the processor readable medium are a ROM, a RAM, a CD-ROM, a magnetic tape, a floppy disk, and an optical data storage device, and the method is also implemented in the form of a carrier wave (such as data transmission through the Internet).

The above-described mobile terminal is not limited to the configuration and method of the above-described embodiments, and some or all of the embodiments may also be selectively combined so that various variations may be implemented.

The invention claimed is:

1. An image photographing device photographing an image through a front camera and a rear camera, the image photographing device comprising:
   a display;
   a feature extractor configured to extract facial features from an image of a user's face displayed on a preview screen through the rear camera;
   a structure extractor configured to extract a structure of the user's face by using the extracted facial features;
   an expression extractor configured to extract an expression of the user by using the extracted facial features if the extracted structure of the face matches a standard facial structure; and
   an alarm configured to output a photographing notification signal if the extracted expression of the user matches a standard facial expression, wherein the expression extractor is further configured to:
extract a closed curve of an eye region and a closed curve of a mouth region; and
detect the expression of the user by using a reference point, a length of a long axis and a length of a short axis of the closed curve of the eye region and the closed curve of the mouth region,
wherein the reference point is an intersection point of the long axis and the short axis.

2. The image photographing device according to claim 1, further comprising a structure comparator configured to check whether the extracted structure of the face matches the standard facial structure.

3. The image photographing device according to claim 2, wherein the alarm comprises a guide signal alarm configured to output a guide signal making user's motion to enable the structure of the user's face to match the standard facial structure, when the extracted structure of the face does not match the standard facial structure.

4. The image photographing device according to claim 1, further comprising an expression comparator configured to check whether the extracted expression of the user matches a standard facial expression.

5. The image photographing device according to claim 4, wherein the alarm comprises a guide signal alarm configured to output a guide signal making user's expression to enable the expression of the user to match the standard facial expression, when the extracted expression of the face does not match the standard facial expression.

6. The image photographing device according to claim 3 or 5, wherein the guide signal comprises at least any one of an auditory guide signal and a tactile guide signal.

7. The image photographing device according to claim 1, wherein the feature extractor uses an Eigenface algorithm to extract the facial features.

8. The image photographing device according to claim 7, wherein the feature extractor extracts the contours of the eyes, nose, mouth, ears and hair regions of the user displayed and extracts the facial features.

9. The image photographing device according to claim 2, wherein the structure extractor extracts the structure of the user's face through geometric verification and the structure of the user's face comprises the angle, position and direction of the user's face.

10. The image photographing device according to claim 1, further comprising a memory configured to store the standard facial structure and the standard facial expression, which are based on images photographed through the front camera.

11. An image photographing method of an image photographing device photographing an image through a front camera and a rear camera, the image photographing method comprising:
displaying an image of a user's face on the preview screen of a display through the rear camera;
extracting facial features from the image of the user's face displayed;
extracting the structure of the user's face by using the extracted facial features;
extracting the expression of the user by using the extracted facial features if the extracted structure of the face matches a standard facial structure; and
outputting a photographing notification signal if the extracted expression of the user matches a standard facial expression,
wherein the extracting the expression of the user includes extracting a closed curve of an eye region and a closed curve of a mouth region and
detecting the expression of the user by using a reference point, a length of a long axis and a length of a short axis of the closed curve of the eye region and the closed curve the mouth region,
wherein the reference point is an intersection point of the long axis and the short axis.

12. The image photographing method according to claim 11, further comprising outputting a guide signal making user's motion to enable the structure of the user's face to match the standard facial structure, when the extracted structure of the face does not match the standard facial structure.

13. The image photographing method according to claim 11, further comprising outputting a guide signal making user's expression to enable the expression of the user to match the standard facial expression, when the extracted expression of the face does not match the standard facial expression.

14. The image photographing method according to claim 12 or 13, wherein the outputting of the guide signal comprises outputting at least any one of an auditory guide signal and a tactile guide signal.

15. The image photographing method according to claim 11, wherein the extracting of the facial features comprises using an Eigenface algorithm to extract the facial features through the contours of the eyes, nose, mouth, ears, and hair regions of the user displayed.

16. The image photographing method according to claim 11, wherein the extracting of the structure of the user's face comprises extracting the structure of the user's face through geometric verification and the structure of the user's face comprises the angle, position and direction of the user's face.

17. The image photographing device according to claim 11, further comprising automatically photographing an image of a user's face displayed on the preview screen of the display when a certain time elapses from when the photographing notification signal is output.

18. The image photographing method according to claim 11, further comprising obtaining the standard facial structure and the standard facial expression through the front camera; and
storing the obtained standard facial structure and standard facial expression.

19. The image photographing method according to claim 18, wherein the storing the standard facial expression includes storing information on a standard eye expression and information on a standard mouth expression.

20. A non-transitory recording medium having thereon a program for executing the image photographing method according to claim 11.

* * * * *